US012129016B2

(12) United States Patent
Scanlan et al.

(10) Patent No.: US 12,129,016 B2
(45) Date of Patent: Oct. 29, 2024

(54) METHOD OF CONTROLLING AN AIRCRAFT

(71) Applicant: WINDRACERS LIMITED, Harrow (GB)

(72) Inventors: James Scanlan, Winchester (GB); Joe Roberts, Peterborough (GB); Tom Reed, Eastleigh (GB)

(73) Assignee: WINDRACERS LIMITED, Harrow (GB)

(*) Notice: Subject to any disclaimer, the term of this patent is extended or adjusted under 35 U.S.C. 154(b) by 0 days.

(21) Appl. No.: 17/618,179

(22) PCT Filed: Jun. 23, 2020

(86) PCT No.: PCT/GB2020/051519
§ 371 (c)(1),
(2) Date: Dec. 10, 2021

(87) PCT Pub. No.: WO2020/260868
PCT Pub. Date: Dec. 30, 2020

(65) Prior Publication Data
US 2022/0227483 A1 Jul. 21, 2022

(30) Foreign Application Priority Data
Jun. 24, 2019 (GB) .................................. 1909018

(51) Int. Cl.
B64C 13/00 (2006.01)
B64C 13/50 (2006.01)
(Continued)

(52) U.S. Cl.
CPC .......... B64C 13/503 (2013.01); B64C 13/505 (2018.01); G05B 9/03 (2013.01); G05D 1/0077 (2013.01); H04B 7/155 (2013.01)

(58) Field of Classification Search
CPC ..... B64C 13/503; B64C 13/505; B64C 13/50; G05B 9/03; G05D 1/0077; G05D 1/0808; H04B 7/155; Y02T 50/40
See application file for complete search history.

(56) References Cited

U.S. PATENT DOCUMENTS

2004/0181499 A1  9/2004  Corban
2004/0195460 A1  10/2004  Sailer
(Continued)

FOREIGN PATENT DOCUMENTS

DE  10 2011 115356 A1  4/2013
DE  10 2011 115360 A1  4/2013
(Continued)

OTHER PUBLICATIONS

International Search Report and Written Opinion of PCT/GB2020/051519, dated Sep. 16, 2020.
(Continued)

Primary Examiner — Ian Jen
(74) Attorney, Agent, or Firm — Brian D. Kaul; Westman, Champlin & Koehler, P.A.

(57) ABSTRACT

Disclosed herein is a method of controlling an aircraft, the aircraft including a plurality of actuators, a plurality of actuator control units, and a plurality of flight control systems for generating control signals. The method comprises, at each of the plurality of actuator control units: (a) from each of the plurality of flight control systems, obtaining a respective control signal for controlling an actuator associated with the actuator control unit, the actuator being one of the plurality of actuators; and (b) providing an actuator control signal to the associated actuator, wherein the actuator control signal is based on an analysis of the obtained control signals.

20 Claims, 5 Drawing Sheets

(51) Int. Cl.
*G05B 9/03* (2006.01)
*G05D 1/00* (2006.01)
*H04B 7/155* (2006.01)

(56) References Cited

U.S. PATENT DOCUMENTS

| | | |
|---|---|---|
| 2007/0033195 A1 | 2/2007 | Stange et al. |
| 2007/0083301 A1 | 4/2007 | Yeh |
| 2007/0135975 A1* | 6/2007 | Stange .................. B64C 13/505 701/3 |
| 2010/0013268 A1* | 1/2010 | Roccato ............... B62D 21/157 296/187.08 |
| 2010/0100260 A1 | 4/2010 | McIntyre et al. |

FOREIGN PATENT DOCUMENTS

| | | | |
|---|---|---|---|
| GB | 1439782 A | 6/1976 | |
| GB | 2280287 A * | 3/1986 | ............. B64C 13/18 |

OTHER PUBLICATIONS

Combined Search and Examination Report of GB1909018.2, dated Dec. 9, 2019.
Examination Report under Section 18(3) of GB1909018.2, dated Apr. 16, 2021.
Martin et al., "A new approach to better low-cost MEMS IMU performance using sensor arrays", Institute of Navigation GNSS, Sep. 2013, Nashville, TN, USA, 18 pages.
Šegvić et al., "A Proposal for a Fully Distributed Flight Control System Design", MIPRO, May 30, 2016-Jun. 3, 2016, Opatija, Croatia, 5 pages.
International Preliminary Report on Patentability and Written Opinion of PCT/GB2020/051519, dated Jan. 6, 2022.
Communication pursuant to Article 94(3) EPC for corresponding European Patent Application No. 20734623.0, dated Jul. 11, 2023.

* cited by examiner

METHOD OF CONTROLLING AN AIRCRAFT

CROSS-REFERENCE TO RELATED APPLICATION

This Application is a Section 371 National Stage Application of International Application No. PCT/GB2020/051519, filed Jun. 23, 2020, and published as WO 2020/260868 A1 on Dec. 30, 2020, in English; the content of which is hereby incorporated by reference in its entirety.

BACKGROUND

Flight Control Systems (FCSs) able to produce signals for automatically controlling one or more systems of an aircraft have become a common feature of aircraft design and operation. By replacing mechanical connections between cockpit controls and aircraft control surfaces, modern Fly-By-Wire (FBW) FCSs are able to automate the majority of processes and commands required to maintain control of an aircraft under normal flight conditions. For example, having obtained navigational information, and data from a suite of sensors, a single FBW FCS can produce a series of control commands for all the control surface actuators of an aircraft to allow the aircraft to maintain a pre-set trajectory. The pilot or operator is then free to focus on other key operational duties for the aircraft, such as radio communications or maintaining situational awareness. However, in order to meet the necessary performance requirements and provide the reliability assurances required for inclusion in a certified airborne system, it is practical to provide certain levels of redundancy to FBW FCSs.

FIG. 1 shows a standard multiply-redundant FBW FCS architecture 100 of the prior art. The architecture 100 comprises two or more FCSs 102a, 102b. Each FCS 102 is connected to a plurality of actuators 104a, 104b via a shared master controller 103. Each of the FCSs 102 is also connected to a respective suite of sensors 101a, 101b.

In use, each FCS 102 receives sensor data from its respective suite of sensors and is configured to produce control commands for each of the plurality of actuators 104. The master controller 103 monitors the operational health of the operating FCSs 102, and allocates one of the operating FCSs to be an active FCS. The FCS allocated as the active FCS by the master controller 103 takes on all flight control responsibilities for the aircraft and is able to send control commands to each of the plurality of actuators 104 via the master controller 103. The remaining operating FCSs are then allocated as stand-by FCSs by the master controller 103, and only take over flight control responsibilities should the active FCS fail.

If the active FCS fails to meet criteria applied by the master controller 103, the master controller 103 will replace the unhealthy active FCS with a healthy stand-by FCS by channeling all flight control responsibilities to the healthy stand-by FCS. The healthy stand-by FCS then becomes the active FCS and is able to send control commands to each of the plurality of actuators 104. The unhealthy FCS may then be deactivated.

SUMMARY OF THE INVENTION

One of the problems associated with the standard multiply-redundant FBW FCS architecture 100 shown in FIG. 1 is that the master controller 103 represents a single point of failure for the architecture 100. Should the master controller 103 fail, there is nothing within the architecture 100 to take its place in arbitrating the active FCS and the one or more stand-by FCSs. In other words, there is no redundancy for the master controller in the standard multiply-redundant FBW FCS architecture 100. This lack of redundancy could lead to a catastrophic failure of the aircraft if the master controller 103 fails. For example, failure of the master controller 103 may mean control commands from the FCSs 102a, 102b are no longer able to reach the actuators 104a, 104b, leading to loss of control of the aircraft. In another example, failure of the master controller 103 may mean that contradictory or incorrect control commands are sent to the actuators 104a, 104b from one or more unhealthy FCSs, again leading to loss of control of the aircraft. It will be understood that the term failure as used herein may comprise any discrepancy from expected or normal operation.

Another problem associated with the standard multiply-redundant FBW FCS architecture 100 shown in FIG. 1 is that high-integrity, certified FCSs are expensive. Therefore, increasing the safety and reliability of an aircraft by providing a greater number of stand-by FCSs can be prohibitively expensive, especially when trying to provide low-cost unmanned aerial vehicles (UAVs).

Thus, in accordance with a first aspect, there is provided a method of controlling an aircraft. The aircraft comprises a plurality of actuators, a plurality of actuator control units, and a plurality of FCSs for generating control signals. The method comprises, at each of the plurality of actuator control units: (a) from each of the plurality of FCSs, obtaining a respective control signal for controlling an actuator associated with the actuator control unit, the actuator being one of the plurality of actuators; and (b) providing an actuator control signal to the associated actuator, wherein the actuator control signal is based on an analysis of the obtained control signals.

In this new masterless flight control methodology and architecture, the plurality of actuator control units is arranged such that control signals from every FCS are available to all the actuator control units. Each actuator control unit then makes its own decision about the actuator control signal to provide to its associated actuator based on an analysis of the respective control signals obtained from all available FCSs. This means that, instead of one active FCS carrying out all flight control responsibilities, flight control responsibilities are distributed among the actuator control units. By making each of the plurality of actuator control units responsible for a small portion of the actuation decision making process, a master controller is no longer required. The single point of failure associated with a master controller is therefore eliminated. This masterless control, in turn, leads to an improvement in safety for the aircraft.

By introducing additional redundancy into the architecture through the provision of a plurality of actuator control units, and by distributing flight control responsibilities among the plurality of actuator control units, the requirement for high-integrity FCSs is reduced. Expensive, high-integrity FCSs can therefore be safely replaced by lower-cost FCSs. This, in turn, leads to a lower overall cost for the aircraft while still maintaining reliability of the architecture, which is particularly important for the ongoing development of low-cost UAVs.

Another problem associated with the standard multiply-redundant FBW FCS architecture 100 shown in FIG. 1 is that an FCS that is assessed as being unhealthy by the master controller is deactivated and replaced by one of the one or more stand-by FCSs. This means that all information from an apparently unhealthy FCS is no longer available for use in taking on flight control responsibilities, even if the FCS contains at least some information that could still be useful for flight control responsibilities. This problem is also solved by the newly proposed architecture and methodology, which allows each individual actuator control unit to decide whether the information provided by each FCS is 'healthy'.

In one example, the analysis on which the actuator control signal is based comprises one or more of: a mean of the obtained control signals; a median of the obtained control signals; and a mode of the obtained control signals. Using one or more of a mean, median, and mode in the analysis of the obtained control signals allows anomalous control signals and/or outlying control signals to be accounted for, facilitating the inclusion of all FCSs into the analysis without the need to deactivate any of the FCSs.

Including all FCSs into the analysis should generally increase the accuracy of the actuator control signal produced by the actuator control unit, thereby increasing the reliability of the aircraft. Using one or more of a mean, median, and mode in the analysis of the obtained control signals also allows easy integration of additional FCSs into the architecture.

Allowing for the inclusion of all FCSs into the analysis (as opposed to deactivating faulty FCSs as per the standard multiply-redundant FBW FCS architecture 100 of FIG. 1) is advantageous because an FCS producing an erroneous (i.e. clearly invalid) control signal for one aspect of the flight control (e.g. an erroneous pitch control signal) may still be producing correct control signals for other aspects of the flight control (e.g. correct roll control signals). Thus, redundancy can be maintained for other aspects of flight control by keeping all FCSs running and accounting for anomalous control signals and/or outlying control signals through use of one or more of a mean, median, and mode in the analysis.

Advantageously, the analysis comprises weighting the obtained control signals. Weighting the obtained control signals allows for adjustment of the relative contribution of any given FCS to the actuator control signal provided by the actuator control unit. For example, the influence of a control signal from an unhealthy FCS on the actuator control signal can be reduced by applying a lower weighting, or its influence can even be eliminated from the analysis altogether. This provides an additional level of control over the actuator control signal produced by the actuator control unit, while still allowing all FCSs to remain running and able to contribute to flight control responsibilities.

In one example, the method further comprises, at each of the plurality of actuator control units, and for each of the plurality of FCSs: determining an age of the obtained respective control signal; and weighting the obtained respective control signal based on the determined age. Thus, if an FCS has failed to produce a control signal over the most recent period of time, for example because it has lost power, then its contribution to the analysis can be reduced or even eliminated by applying an appropriate weighting. This ensures that control signals which are out-of-date do not adversely affect the provided actuator control signals. Thus, the aircraft is controlled in response to the current flight conditions.

In another example, the method further comprises, at each of the plurality of actuator control units, and for each of the plurality of FCSs: weighting the obtained respective control signal based on the similarity of the obtained respective control signal to the other obtained control signals. Weighting in this manner allows for an outlying control signal to be weighted so as to reduce its influence on the analysis, or so as to be eliminated from the analysis altogether. Comparing the similarity of an obtained respective control signal to the other obtained control signals also facilitates the determination of a relative health status of the FCSs, as opposed to determining the health status of any one FCS in isolation. In addition, this method of determining 'health status' is appropriate for a particular control signal for a particular actuator control unit, rather than being defined across an entire FCS system (as in the prior art). Thus, as discussed above, the present methodology takes account of the fact that an FCS producing an erroneous control signal for one aspect of the flight control (e.g. an erroneous pitch control signal) may still be producing correct control signals for other aspects of the flight control (e.g. correct roll control signals).

In a further weighting example, the method further comprises, at each of the plurality of actuator control units, and for each of the plurality of FCSs: weighting the obtained respective control signal based on whether the obtained respective control signal exceeds a threshold. Such a weighting allows erroneous or invalid control signals to be eliminated from the analysis, reducing computational power and computation time required for the remainder of the analysis.

Optionally, the method further comprises controlling the associated actuator with the actuator control signal. This obviates another problem associated with the standard multiply-redundant FBW FCS architecture 100 shown in FIG. 1. Namely, in FIG. 1, the flight control signals are sent to the actuator by the master controller 103. Therefore, if the master controller 103 fails, control signals may not be able to reach any of the actuators 104. In contrast, in the new architecture proposed herein, having each of the plurality of actuator control units control its associated actuator means that failure of any one actuator control unit will not usually lead to total loss of control of the aircraft. The other functioning actuator control units will still be able to control their associated actuators, allowing control of the aircraft to be maintained. This is another example of how the safety and reliability of the architecture and the aircraft is improved by removing the single point of failure associated with the master controller 103.

In one example, the associated actuator is associated with only one actuator control unit, such that the associated actuator is provided an actuator control signal from only one actuator control unit. This reduces the risk of the actuator receiving contradictory control signals or erroneous control signals from another actuator control unit. This further improves the safety and reliability of the architecture and the aircraft.

Optionally, the method further comprises transmitting the control signals via a first communication network to enable each of the plurality of actuator control units to obtain the control signals. Transmitting the control signals on a first communication network common to all of the FCSs and all of the actuator control units simplifies communications between the FCSs and the actuator control units. This reduces the complexity of the architecture, thus reducing the weight and cost of the architecture, and allowing for easier maintenance and expansion of the architecture.

Another problem associated with the standard multiply-redundant FBW FCS architecture 100 shown in FIG. 1 is that each FCS 102 has its own suite of sensors 101, where the suite of sensors comprises a plurality of individual sensors for measuring the parameters required to allow the FCS to carry out flight control responsibilities. Failure of an FCS in this architecture 100 would lead to an entire suite of sensors being unavailable to the rest of the architecture, even if all sensors are operating correctly. This leads to perfectly serviceable sensor signals being wasted if an FCS fails.

Equally, failure of one or more of the sensors will affect the apparent health of the entire respective FCS, such that it may be assessed as needing to be replaced with another FCS by the master controller. Consequently, an otherwise healthy FCS may be deactivated by the master controller simply because it is connected to a faulty sensor. A sensor may be considered faulty if it produces an erroneous signal due to, for example, poor calibration, physical damage, or noise. A faulty sensor may also produce no signal at all. Such problems are solved by the new architecture as described below.

Advantageously, the aircraft further comprises at least one sensor, and the method further comprises the at least one sensor providing sensor data to each of the plurality of FCSs. Thus, sensor data from the at least one sensor is available to all FCSs even during failure of one or more FCSs. This methodology fully exploits the sensor data and sensor resources available, thereby avoiding the wastage of fully operational sensors which can occur in the standard multiply-redundant FBW FCS architecture 100.

The FCSs also need not each have their own suite of sensors. Providing sensor data from the at least one sensor to all of the FCSs can therefore also lead to a reduction in weight and costs by reducing the total number of sensors on the aircraft. Furthermore, since the accuracy of a sensor may depend on its proximity to a particular portion of an aircraft, reducing the total number of sensors means that a small number of sensors may be placed at optimal positions on the aircraft, rather than having to over populate or crowd the optimal positions with a large number of sensors. Optimally placed sensors may achieve redundancy while also improving the accuracy of the sensor data. Alternatively, the same number of sensors may be used as in the prior art, but all of the sensor data would be available to all FCSs, thereby providing additional redundancy at no extra cost. Furthermore, by providing sensor data from the at least one sensor to all FCSs, the required sensor data from a faulty sensor may instead be provided to the FCS by another, fully functioning sensor. The effects of a faulty sensor on the apparent health of a respective FCS may therefore be avoided.

In one example, the at least one sensor comprises at least one high data rate sensor providing sensor data at a first data rate to at least one of the plurality of FCSs and providing sensor data at a second data rate to other ones of the plurality of FCSs, the first data rate being higher than the second data rate. In this way, not all high data rate sensor data need be transmitted at a high data rate to every one of the plurality of FCSs. This increases control over the available communications bandwidth on board the aircraft, thereby allowing for a reduction in the total communications bandwidth required to operate the aircraft and/or for making communications bandwidth available for other communications required to operate the aircraft. Furthermore, this reduction and/or reallocation of communications bandwidth can occur while still allowing for comparison and/or cross-checking of the data from the at least one high data rate sensor at each of the plurality of FCSs since data from each high data rate sensor can still be provided to all FCSs, albeit at a reduced data rate in some cases. Equally, providing sensor data in this way increases control over the available processing power of the plurality of FCSs, thereby allowing for a reduction in the total processing power required to operate the aircraft. Moreover, reducing the required processing power can ultimately reduce the size and/or number of processors required on the aircraft, thereby saving weight and cost.

Optionally, the at least one high data rate sensor comprises at least one inertial measurement unit (IMU). IMUs typically comprise multiple sensors, namely gyroscopes and accelerometers, to allow for measurement of up to six degrees of freedom and thus may produce large quantities of data in a relatively short period of time. Splitting the data provided by the IMU to the plurality of FCSs as described above therefore allows for a reduction in the volume of transmitted IMU data while still allowing for comparison and/or cross-checking of the IMU data at each of the plurality of FCSs. In one example, the method further comprises, at each of the plurality of FCSs, generating, based on the sensor data, the control signals for controlling the plurality of actuators.

Optionally, the method further comprises transmitting the sensor data via the first communication network to enable each of the plurality of FCSs to obtain the sensor data. Transmitting the sensor data on the first communication network common to all of the FCS and all of the actuator control units further simplifies communications between components of the architecture, saving on wiring and reducing weight and costs. A simpler architecture is also easier to maintain and expand.

Alternatively, the method further comprises transmitting the sensor data via a second communication network to enable each of the plurality of FCSs to obtain the sensor data. Transmission of the sensor data via a second communication network reduces the likelihood of error propagation between the first and second communication networks, and allows for different methods of transmission (e.g. wired and/or wireless communications) and/or different data transfer protocols to be used for the sensor data and control signals, for example.

Advantageously, at each of the actuator control units, the analysis of the obtained control signals is independent of analysis carried out at the other actuator control units. Thus, each actuator control unit makes its own decision about the actuator control signal to provide to its associated actuator, and does not communicate with any of the other actuator control units. Therefore, the analysis carried out by each actuator control unit cannot be influenced by any of the other actuator control units. In other words, an erroneous actuation decision made by one actuator control unit cannot be passed onto another actuator control unit. This reduces the likelihood of fault propagation between the actuator control units, improving the reliability of the architecture and the aircraft.

Advantageously, each of the plurality of FCSs operates independently of the other FCSs. Thus, each of the plurality of FCSs generates control signals independently of the other FCSs, and does not communicate with any of the other FCSs. Therefore, an erroneous control signal generation by one FCS cannot be passed onto another FCS. This eliminates the possibility of fault propagation between the FCSs, improving the reliability of the architecture and the aircraft.

In one example, the aircraft further comprises a communications manager, and the method further comprises one or more of: receiving, by the communications manager, state data from at least one FCS for determining a state of the at least one FCS; and transmitting, by the communications manager, synchronisation information to at least one of the plurality of FCSs for synchronising operation of the plurality of FCSs. Therefore, although every one of the plurality of FCSs may operate independently, information about the state of each individual FCS can still monitored. Moreover, the FCSs can be provided with information to synchronise their operations. Thus, it can be ensured that the plurality of independently operating FCSs are nonetheless coordinated in working towards a common goal.

Optionally, the state data comprises one or more of: an attitude of the aircraft; a position of the aircraft; an airspeed of the aircraft; an altitude of the aircraft; a network status of the flight control system; a health status of the flight control system; and a power status of the flight control system. The communications manager thus collects data from each of the plurality of FCSs for providing an overview of the plurality of FCSs, thereby enabling a comparison of the current operational status of the plurality of FCSs and/or an assessment of the overall "health" of the FCSs or the aircraft as a whole.

Optionally, the synchronisation information comprises one or more of: a flight mode; at least one waypoint; at least one rally point; at least part of a mission; and at least one flight control parameter. Providing such synchronisation information to one or more of the plurality of FCSs enables the communications manager to synchronise the operations of the plurality of FCS.

Advantageously, the method further comprises processing, by the communications manager, the state data to determine the state of the aircraft and/or the at least one FCS. Thus, rather than transmitting the state data to, for example, a ground control station for processing and review, the status of the plurality of FCSs is instead determined on board the aircraft by the communications manager. This allows for a reduction and/or reallocation of communications bandwidth between the aircraft and the ground, which is particularly important for the control of UAVs.

Optionally, the processing comprises generating an alert or warning message based on the state data. By processing the state data to generate an alert or warning message using the communications manager, the state data of the plurality of FCSs is compressed into a simple message. Thus, there is a reduction in the amount of data transmitted, for example, to a pilot of the aircraft, or to a person or system operating the aircraft from the ground as may be the case for a UAV. This allows for a reduction and/or reallocation of communications bandwidth. Moreover, operation of the aircraft by an operator on the ground is simplified.

Optionally, the method further comprises one or more of: receiving, by the communications manager, the synchronisation information from a ground control station; and transmitting, by the communications manager, the state data to a ground control station. Thus, the communications manager facilitates the synchronisation of the plurality of FCSs by a ground control station (which may be manned or operated by one or more human operators) and/or the provision of feedback to the ground control station regarding the current state of the plurality of FCSs. Thus, the communications manager increases the level of control the operator has over the aircraft as well as the amount of feedback available to the operator. Such additional levels of control and feedback are particularly useful for the operation of UAVs, for example by an operator based at the ground control station.

In accordance with a second aspect, there is provided an aircraft system comprising: a plurality of actuators; a plurality of actuator control units; and a plurality of FCSs for generating control signals. This aircraft system is arranged to carry out any of the methods described above. The system may be provided with a plurality of sensors, a first communication network, and/or a second communication network as necessary.

Optionally, the aircraft system may further comprise one or more of: at least one sensor; at least one high data rate sensor; a first communication network; a second communication network; and a communications manager.

DETAILED DESCRIPTION

Figure 4:
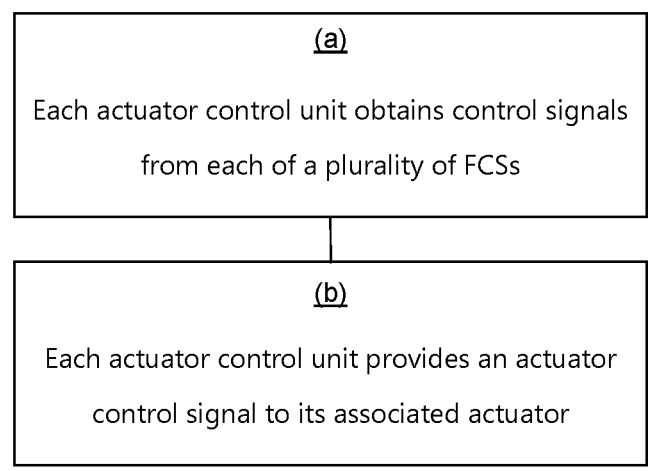
FIG. 4 is a flow chart depicting the new flight control methodology as described herein.

Here, we describe a method of controlling an aircraft that comprises a plurality of actuators, a plurality of actuator control units, and a plurality of FCSs for generating control signals. Together, the plurality of actuators, the plurality of actuator control units, and the plurality of FCSs form a new and improved architecture. As shown in FIG. 4, the method comprises, at each of the plurality of actuator control units: (a) from each of the plurality of FCSs, obtaining a respective control signal for controlling an actuator associated with the actuator control unit, the actuator being one of the plurality of actuators; and (b) providing an actuator control signal to the associated actuator, wherein the actuator control signal is based on an analysis of the obtained control signals. The architecture and methodology will be described in further detail below.

Flight Control Architecture

Figure 1:
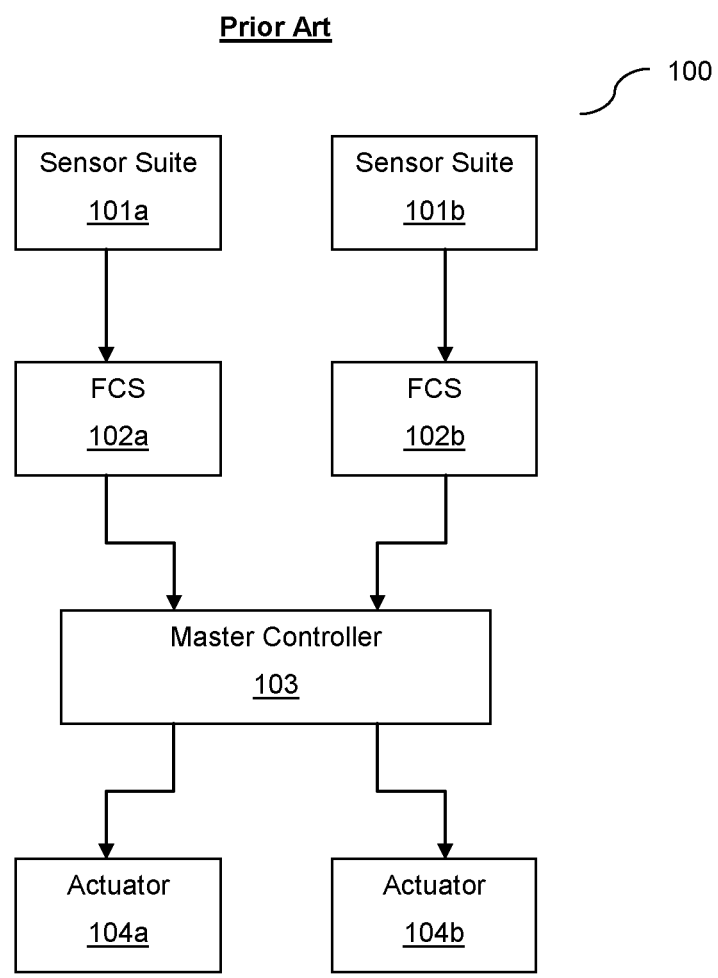
FIG. 1 is a schematic diagram of a standard multiply-redundant FBW FCS architecture according to the prior art.
Figure 2A:
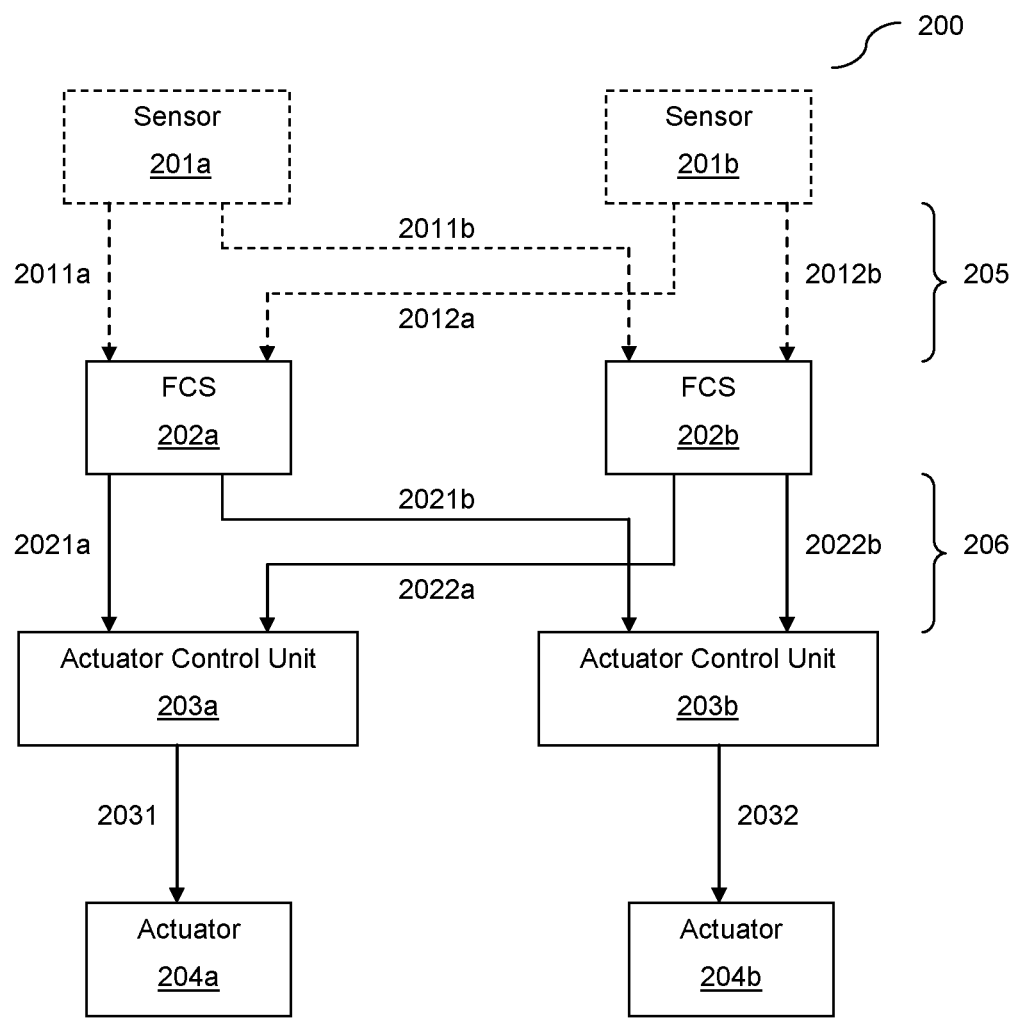
FIG. 2A is a first schematic diagram of a new flight control architecture as described herein.

FIG. 2A is a schematic diagram of a flight control architecture 200 which may be used in accordance with the above methodology. The architecture 200 is suitable for installation as part of an aircraft system within an aircraft. The aircraft may be a manned aircraft, or an unmanned aerial vehicle (UAV), also known as a drone. The architecture 200 is also suitable for installation in an unmanned aerial vehicle system (UAS), which includes a drone ground control station from which to operate the drone. The architecture may be thought of as comprising a plurality of levels, each level having one type of component. Thus, the architecture 200 comprises a sensor level formed by a plurality of sensors 201, an FCS level formed by a plurality of FCSs 202, an actuator control unit level formed by a plurality of actuator control units 203, and an actuator level formed by a plurality of actuators 204. Each of the FCSs 202 is connected to each of the actuator control units 203 by means of a first communication network 206. Each of the sensors 201 is connected to each of the FCSs by means of a second communication network 205. These networks 205, 206 may form part of the same communication network, or may be different communication networks (of the same or different types, e.g. wired/wireless), as will be described in further detail later.

Regarding the example architecture 200 shown in FIG. 2A, only two FCSs 202a, 202b are shown, but it will be appreciated that one or more additional FCSs could be provided as desired. Each additional FCS will potentially improve the redundancy and reliability of the overall architecture 200, but this improvement comes with increased costs and the requirement for more processing power. Thus, a balance is to be struck depending on the application.

Similarly, although FIG. 2A shows only two actuator control units 203a, 203b, it will be appreciated that the architecture could comprise more than two actuator control units as required. Equally, although FIG. 2A shows only two actuators 204a, 204b, it will be appreciated that the architecture could comprise more than two actuators. Furthermore, it will be appreciated that one or more of the plurality of actuators 204 may comprise a group of actuators. Again, whilst FIG. 2A shows two sensors 201a, 201b, it will be appreciated that the architecture could alternatively comprise one sensor, or more than two sensors. More specifically, the numbers of FCSs, actuator control units, actuators, and sensors within the architecture 200 are decoupled. For example, the number of FCSs in the architecture 200 is independent from the number of actuator control units, actuators, and sensors within the architecture 200. Similarly, the number of actuator control units in the architecture 200 is independent from the number of FCSs, actuators, and sensors within the architecture 200, and so on.

Each FCS 202 (also known as a flight controller or flight control computer) is configured to generate control signals for controlling the flight of an aircraft. Preferably, the generation of control signals at each FCS 202 is independent of the generation of control signals by each other FCS. Thus, FCS 202a is configured to generate control signals for controlling the flight of the aircraft and, separately, FCS 202b is also configured to generate control signals for controlling the flight of the aircraft. Typically, when functioning correctly, any one of the plurality of FCSs 202 is able to generate respective control signals for controlling the entire aircraft, such that each of the plurality of FCSs 202 is able to independently automate the flight of the aircraft with little or no input from a human pilot. The respective control signals generated by each FCS 202 represent a decision made by each FCS 202 on how best to actuate each of the plurality of actuators 204 in order to maintain control of the aircraft. The control signals may comprise commands for actuating each actuator 204. The commands may be generated by the FCS based on an analysis of sensor data received from one or more of the plurality of sensors 201. Each FCS 202 is therefore able to perform its own arbitration of different sensor data types (e.g. GNSS data, airspeed data) to compute critical flight control commands for the aircraft. It will be appreciated that the control signals generated by each FCS may comprise a set of control signals suitable for distribution among the plurality of actuators. For example, the control signals generated by each FCS may comprise one control signal for each of the plurality of actuators 204.

In order to allow the FCSs 202 to generate control signals, each FCS 202 may include a plurality of flight control sub-systems for guidance, navigation, and control. The flight control sub-systems may include, for example, an autopilot unit for carrying out guidance and navigation functions and a Stability Augmentation System (SAS) for low level control and/or stabilisation of the aircraft.

Each actuator control unit 203 is configured to obtain control signals generated by the FCSs 202, and to provide actuator control signals to a respective associated actuator among the plurality of actuators 204. In other words, each actuator control unit 203 acts as an interface between the FCSs 202 and the actuators 204. It will be understood that obtaining, in the context of the application, may include directly obtaining, or obtaining via an intermediate (i.e. indirectly obtaining).

Each actuator 204 is associated with one of the actuator control units 203. Within the example architecture 200 of FIG. 2A, the first actuator 204a is associated with the first actuator control unit 203a, and the second actuator 204b is associated with the second actuator control unit 203b. Each actuator control unit 203 listens for control signals from the FCSs 202 and takes on responsibility for actuating a small portion of the aircraft by actuating its associated actuator 204. Consequently, at no point during operation with more than one FCS 202 does any single FCS control any given actuator directly. This is an example of masterless control. Details regarding an exemplary implementation of an actuator control unit 203 are described later in relation to FIG. 3.

An individual actuator 204 of the plurality of actuators 204 is configured to actuate one or more control systems (not shown) of an aircraft, and may be considered as a control effector responsible for manipulating a flight state of the aircraft. Actuation may include actuation of mechanical aircraft control systems (such as servos or rams for control surfaces) or actuation of virtual aircraft control systems (such as computer systems on board the aircraft). For example, an actuator 204 may be configured to actuate one or more flight control surfaces of an aircraft. Flight control surfaces may comprise one or more of, for example, an aileron, an elevator, a rudder, a spoiler, a flap, a slat, and an airbrake. In one example, an actuator 204 may be configured to actuate one or more engine controls of the aircraft. Engine controls may comprise one or more of, for example, throttle controls, and fuel controls. Each actuator 204 could be one of a number of different types of actuator. For example, an actuator 204 could be any one of, or combination of, a linear actuator, a rotary actuator, a hydraulic actuator, a pneumatic actuator, a servo, and an electric motor. Electronic actuators are also envisaged for actuation of virtual aircraft control systems, for example. Nonetheless, it will be appreciated that any appropriate type of actuator could be used depending on the aircraft control system being actuated.

The architecture 200 may comprise multiple actuators 204 of the same type for installation at substantially the same location on the aircraft, thereby providing redundancy should a particular type of actuator fail. Preferably, at least three of each type of actuator will be provided for carrying out a particular role. For example, the architecture 200 preferably comprises three actuators 204 for each control surface of the aircraft for the sake of redundancy. The control surface is then said to be overactuated. In other words, for an overactuated system, there is a non-unique actuation solution to achieve the desired flight state. In one example, an overactuated flight control surface (such as a flight control surface for controlling pitch, roll, or yaw, for example) may be segmented into three portions, each portion being actuated by one of three duplicate actuators 204. Should one actuator of this overactuated segmented control surface fail and become stuck in a given position, one of the remaining two actuators can apply an opposite actuation to its respective segment of the control surface and cancel out the failed actuator, while the final actuator can still actuate the remaining segment of the control surface to continue controlling the aircraft. While an architecture 200 having at least three actuators 204 per control surface is preferable, it will be understood that the architecture 200 may comprise one actuator 204 per control surface (known as a critically actuated system), or two actuators 204 per control surface, for example. While overactuation is described above with respect to control surfaces, it will be appreciated that overactuation can be applied to any actuated system within the aircraft.

Each sensor 201 is configured to collect sensor data for use in enabling one or more of the FCSs 202 to generate control signals. Each sensor 201 is able to provide sensor data to each FCS 202. In other words, every one of the plurality of FCSs may have access to the sensor data from every one of the plurality of sensors 201, such that all sensor data may be available to every FCS. One or more of the sensors 201 may comprise an individual sensor for obtaining sensor data. Additionally/alternatively, one or more of the sensors 201 may comprise a suite or group of sensors for obtaining sensor data related to one or more parameters of the flight of the aircraft. Each sensor 201 may be the same type sensor. However, more likely, the sensors 201 may comprise more than one type of sensor. The architecture 200 may include several sensors for monitoring the same parameter so as to provide redundancy should an individual sensor fail. Each sensor 201 is configured to provide sensor data related to one or more parameters of the flight of the aircraft, such as data relating to the aircraft itself, data relating to the trajectory of the aircraft, and/or data relating to the flight conditions. Each sensor 201 could be one of a number of different types of sensor. For example, each sensor 201 could be any one of, or combination of, an airspeed sensor, an attitude sensor, an altitude sensor, an inertial measurement unit (IMU), an accelerometer, a gyroscope, a Global Navigation Satellite System (GNSS) sensor, a Global Positioning System (GPS) sensor, a pressure sensor, a temperature sensor, a stress sensor, a telemetry radio for ground communication, a laser height sensor, a radar altimeter, a horizon-sensing photodiode, a vision sensor, a camera, and a magnetic field sensor. It will be understood that this list of sensor types is not limiting, and any type of sensor could be provided as desired for monitoring the flight of the aircraft. The number of sensors 201 may be independent of the number of FCSs 202 and/or actuator control units 203 in the architecture 200.

In one example, at least one of the sensors 201 may be a specialised sensor having a high (e.g. above average, or above a minimum) data rate relative to the plurality of sensors as a whole. Such sensors will be referred to hereafter as 'high data rate sensors'. A high data rate sensor is capable of making many measurements over a relatively short period of time, thereby providing a large volume of data over a relatively short period of time. In other words, a high data rate sensor may measure and output data at a high frequency. Furthermore, each high data rate sensor is preferably configured or arranged to provide data at a first data rate to a respective first set of the FCSs 202 and data at a second data rate to a respective second set of the FCSs 202. The first set of the FCSs 202 may comprise one of the plurality of FCSs 202, and the second set of the FCSs 202 may comprise all of the other FCSs 202.

The data rate of the one or more high data rate sensors may be adjusted, for example, by changing a sampling rate of the sensor or by applying one or more splitters and/or filters to the sensor output. This adjustment of the sensor data rate could be digital or analogue. In one example, the output of at least one high data rate sensor is duplicated, and one or more of the duplicated outputs is filtered or (re) sampled to reduce a data rate of the duplicated output. However, it will be appreciated that a sensor data rate could be altered and/or split and/or filtered in any number of ways, which could be done by the sensor itself or by one or more modules external to the sensor. Moreover, it will be appreciated that the data rate of a normal sensor (that is to say not a high data rate sensor) could also adjusted analogously.

Typically, a data rate is expressed in units such as megabits per second (Mbit/s). A comparatively faster data rate is therefore represented with a larger Mbit/s value.

Figure 2B:
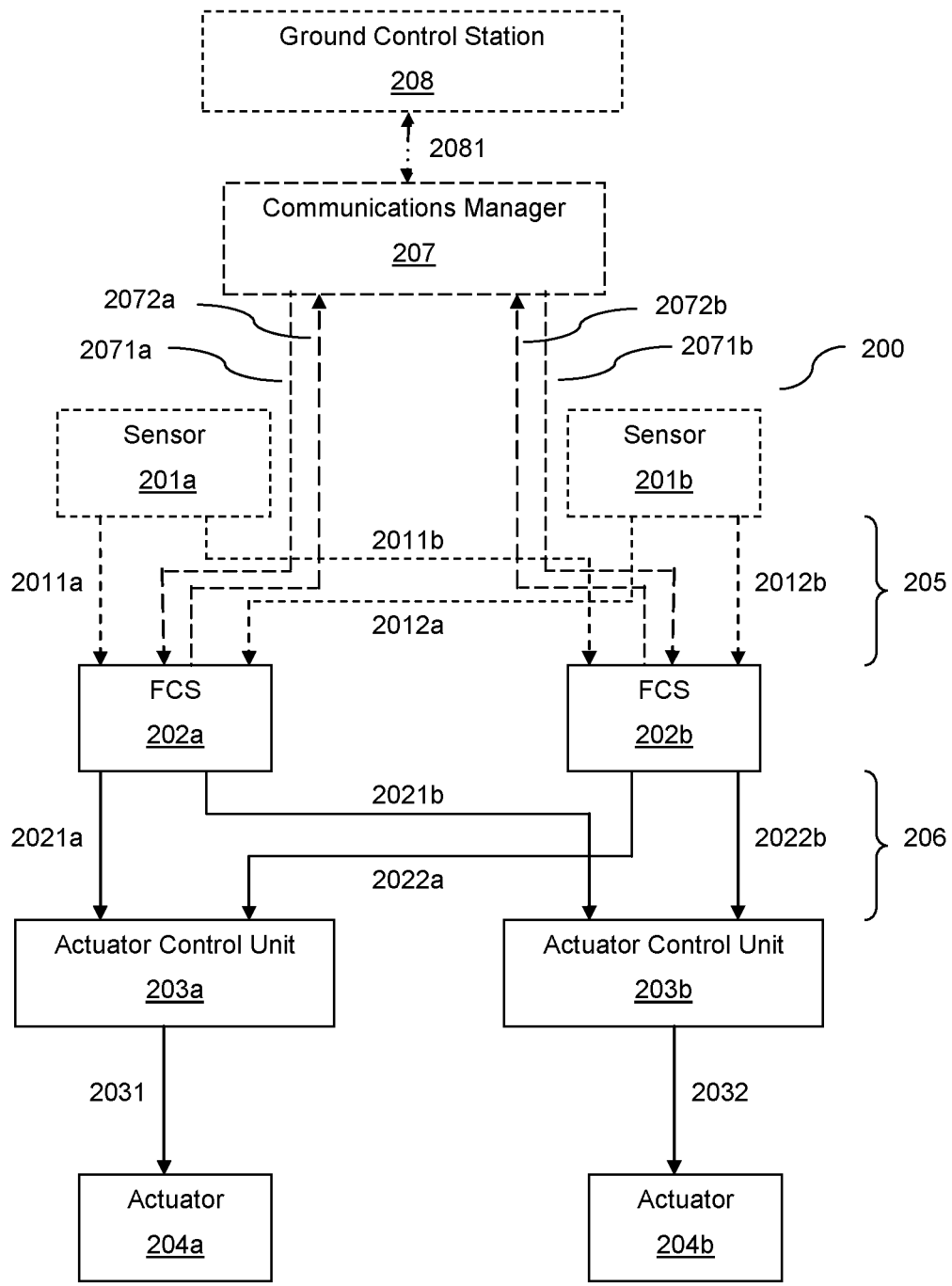
FIG. 2B is second schematic diagram of a new flight control architecture as described herein.

In one example shown in FIG. 2B, the architecture 200 may further comprise a communications manager 207 configured to facilitate communications between a ground control station (GCS) 208 for the aircraft and the plurality of FCSs 202. In particular, the communications manager 207 is responsible for transmitting synchronisation information to at least one of the plurality of FCSs 202 for synchronising operation of the plurality of FCSs 202 and/or receiving state data from at least one of the plurality of FCSs 202 for determining an overall state or status of the aircraft and/or the at least one FCS 202. In some examples, the communications manager 207 also carries out processing of the synchronisation information and/or state data.

Synchronisation information may comprise, for example, one or more of: a flight mode; at least one waypoint or at least one waypoint mission; one or more rally points; at least part of a mission; and at least one flight control parameter for use in a ground-based set-up phase of the FCSs 202. A flight mode may be a mode of operation for the plurality of FCSs 202 or for the aircraft as a whole. A mission may comprise at least one task or set of tasks to be completed by the aircraft and/or the pilot/operator during flight or on the ground. The synchronisation information may comprise at least one command to be carried out by at least one of the FCSs 202. Alternatively, or in addition, the synchronisation information may comprise a list of parameters (e.g. one or more waypoints, rally points, mission items, and flight control parameters) to be updated at one or more of the FCSs 202. This could include addition and/or deletion of such parameters at the FCSs 202.

In one example, synchronisation information is generated by the communications manager 207. In another example, synchronisation information is generated at the GCS 208 and subsequently provided to the communications manager 207, for example by a communications link 2081. The GCS 208 may comprise, for example, one or more of: a remote control interface, and a facility (e.g. a control tower or command post) having a plurality of systems for controlling and/or communicating with the aircraft. At least one human operator for the aircraft may be based at the GCS 208. Alternatively, or in addition, the GCS 208 may comprise a non-human operator for the aircraft, for example to automate control of the aircraft.

Each of the plurality of FCSs 202 is capable of generating respective state data, indicative of the operational status of that particular FCS. In one example, the state data may comprise one or more of the control signals generated by the FCS. Alternatively, or additionally, state data may comprise data generated by the FCS specifically for reporting its health or status. In particular, the state data generated by an FCS may comprise, for example, one or more of an attitude of the aircraft (according to that FCS); a position of the aircraft (according to that FCS); an airspeed of the aircraft (according to that FCS); an altitude of the aircraft (according to that FCS); a network status of that FCS; a health status of that FCS; and a power status of that FCS. It will also be understood that, should a FCS fail to generate state data, the communications manager 207 may respond accordingly, for example by generating null state data for the failed FCS.

In this way, the communications manager 207 acts as a "spokesman" for the plurality of FCSs 202, thereby ensuring that the FCSs 202 are working towards a common goal (for example, by ensuring that the next waypoint is the same for all the FCSs 202). Crucially however, the communications manager 207 is not critical to the safe operation of the aircraft. In other words, the communications manager 207 is not in the critical path of the aircraft and so does not constitute a single point of failure of the overall flight control architecture. For example, should the communications manager 207 fail, the pilot or GCS-based operator, for example, will still have full control of the aircraft. It will be appreciated that although only one communications manager 207 is shown in the architecture 200 of FIG. 2B, one or more additional communications managers could be provided for the sake of redundancy. Moreover, it will be appreciated that a plurality of communications managers may share a single communications link 2081 to the GCS 208, and that the architecture may thus be configured to allow switching between communications managers should a failure occur.

Methodology

As mentioned above and as shown in FIG. 4, the present methodology comprises a first step (a) that is performed at each of the plurality of actuator control units 203. In particular, from each of the plurality of FCSs 202, each actuator control unit 203 obtains a respective control signal that is suitable for controlling an actuator 204 (of the plurality of actuators) that is associated with that actuator control unit 203. Within the example architecture 200 shown in FIG. 2A, the first actuator control unit 203a obtains a first control signal 2021a from the first FCS 202a, and obtains a second control signal 2022a from the second FCS 202b. Similarly, the second actuator control unit 203b obtains a third control signal 2021b from the first FCSs 202a, and obtains a fourth control signal 2022b from the second FCS 202b. The first and second control signals 2021a, 2022a are suitable for controlling the first actuator 204a. The third and fourth control signals 2021b, 2022b are suitable for controlling the second actuator 204b.

In order for an actuator 204 to be associated with a particular actuator control unit 203, the actuator control unit should be able to provide the particular actuator with an actuator control signal. Within the example architecture 200 shown in FIG. 2A, the first actuator 204a is provided a first actuator control signal 2031 from the first actuator control unit 203a. Similarly, the second actuator 204b is provided a second actuator control signal 2032 from second actuator control unit 203b. The actuator control signals 2031 2032 may be provided in any number of ways (wired, wireless, direct, indirect, etc.).

Returning to the control signals passing between the FCSs 202 and the actuator control units 203, let us consider (as an example), the control signals obtained by the first actuator control unit 203a. The first control signal 2021a and the second control signal 2022a may comprise commands suitable for actuating the first actuator 204a associated with the first actuator control unit 203a. The commands may comprise values representing the required state of the first actuator 204a according to decisions made by the FCSs 202. However, these commands are not sent directly to the first actuator 204a from the FCSs 202. Instead, the first actuator control unit 203a receives the commands (in the form of the control signals 2021a, 2022a) and carries out an analysis to decide how to actuate the first actuator 204a. Details of this analysis are discussed below.

Analysis Performed by the Actuator Control Units

As mentioned above, after the step (a), the method further comprises a step (b) performed at each of the plurality of actuator control units. In particular, the step (b) comprises each actuator control unit providing an actuator control signal to its associated actuator. Importantly, the actuator control signal is based on an analysis of the obtained control signals.

Thus, having obtained the first and second control signals 2021a, 2022a, the first actuator control unit 203a provides the first actuator control signal 2031 to its associated actuator 204a. The first actuator control signal 2031 is based on an analysis of the first and second control signals 2021a, 2022a. Similarly, having obtained the third and fourth control signals 2021b, 2022b, the second actuator control unit 203b provides the second actuator control signal 2032 to its associated actuator 204b. The second actuator control signal 2032 is based on an analysis of the third respective control signal 2021b and the fourth respective control signal 2022b.

The first actuator control signal 2031 provided by the first actuator control unit 203a is suitable for controlling the first actuator 204a. The first actuator control signal 2031 may therefore comprise a signal for directly actuating the first actuator 204a, such as a pulse width modulation (PWM) signal. Alternatively, the first actuator control signal 2031 may comprise commands to be interpreted by the first actuator 204a, such as a set of computer program instructions. However, it will be appreciated that the form of the first actuator control signal 2031 sent to the first actuator 204a will depend on the type of actuator. In a similar manner, the second actuator control signal 2032 provided by the second actuator control unit 203b is suitable for controlling the second actuator 204b. The second actuator 204b need not be the same type of actuator as the first actuator 204a, such that the second actuator control signal 2032 may be substantially different to the first actuator control signal 2031.

The analysis of the first and second control signals 2021a, 2022a carried out by the first actuator control unit 203a allows the first actuator control unit 203a to make its own decision about how to actuate the associated first actuator 204a. The first control signal 2021a represents the decision of the first FCS 202a on how best to actuate actuator 204a, and the second control signal 2022a represents the decision of the second FCS 202b on how best to actuate actuator 204a. Thus, the analysis carried out by the first actuator control unit 203a provides an opportunity for the actuation decisions made by the FCSs 202 to be checked and managed by the first actuator control unit 203a before making a final decision about actuation of the first actuator 204a. In other words, the analysis carried out by the first actuator control unit 203a allows for a fusion or mixing of the control signals generated by the FCSs 202. The same applies analogously to the second actuator control unit 203b, which carries out an analysis of the third respective control signal 2021b and the fourth respective control signal 2022b to make its own decision about how to actuate the associated second actuator 204b.

The actuator control signals may be discretised or continuous (i.e. non-discrete) in nature. Optionally, the analysis carried out at each of the plurality of actuator control units 203 comprises a mean (or average) and/or a median and/or a mode of the obtained control signals. Additionally, or alternatively, the analysis carried out at each of the plurality of actuator control units 203 comprises a time series analysis of the obtained control signals. For example, at least some of the obtained control signals may be stored in a memory of the actuator control units 203 such that changes in the obtained control signals over time may be used in the analysis or fed back into the analysis. Additionally, or alternatively, the analysis carried out at each of the plurality of actuator control units 203 comprises a regression or extrapolation of the obtained control signals. Moreover the analysis may be carried out by one or more artificial neural networks, may utilise one or more artificial neural networks, or may make use of machine learning. For example, the analysis carried out at each of the plurality of actuator control units 203 may make use of one or more of the obtained control signals 2021, 2022 to teach a respective at least one machine learning module (not shown) how best to actuate its respective actuator 204.

In one example, the first actuator control signal 2031 provided by the first actuator control unit 203a to its associated actuator 204a may be based on a mode of the control signals 2021a, 2022a obtained from each of the plurality of FCSs 202. It will be understood that the concept of a 'mode' is applicable to discretised control signals only. However, non-discrete control signals may be converted into discrete control signals. For example, non-discrete control signals may be rounded or truncated to a certain level of precision during the analysis carried out by an actuator control unit. An analysis of the mode could then be carried out on the discretised control signals. In another example, the first actuator control signal 2031 provided by the first actuator control unit 203a to its associated actuator 204a may be based on an average of the control signals 2021a, 2022a obtained from each of the plurality of FCSs 202. This example will be discussed in further detail below.

The pseudo-code below outlines one example of how an actuator control unit may provide an actuator control signal to its associated actuator based on the mean of two obtained respective control signals.

```
1    ControlSignals = {0.5, 0.6}
2
3    NumberOfControlSignals = 0
4    ControlSignalSum = 0
5
6    For Each ControlSignal
7    {
8      If (min < ControlSignal < max)
9      {
10        ControlSignalSum = ControlSignalSum + ControlSignal
11        NumberOfControlSignals = NumberOfControlSignals + 1
12     }
13   }
14
15   ActuatorControlSignal = ControlSignalSum /
       NumberOfControlSignals
```

Line 1 of the pseudo-code presents a variable named ControlSignals for storing the values of the obtained respective control signals. In this example, the two obtained respective control signals are stored in an array as two numerical values: 0.5 and 0.6 respectively. Each individual value may be represented by the variable ControlSignal, introduced in line 6 of the pseudo-code.

Line 3 and 4 of the pseudo-code initialize variable named NumberOfControlSignals and ControlSignalSum. ControlSignalSum is used for summing the control signals being used as part of the averaging process. NumberOfControlSignals is used for storing the number of control signals used as part of the averaging process.

Lines 6 to 13 of the pseudo-code present a FOR loop for summing the obtained respective control signals and counting the number of summed control signals (see lines 10-11 in particular). At line 8 of the pseudo-code, the FOR loop is shown to include an IF statement that provides maximum and minimum thresholds for each obtained respective control signal. If the value of the obtained respective control signal does not fall within the defined min-max range, it will not be included in the sum. It will be appreciated that this thresholding is not essential for the averaging processes, but it may be included to filter out erroneous/invalid or outlying control signals from the averaging process.

Line 15 of the pseudo-code presents the determination of a variable named ActuatorControlSignal, which represents the actuator control signal to be provided by the actuator control unit. Here, in line with the usual method for calculating a mean value, the actuator control signal variable is defined as the sum of the relevant control signals divided by the number of relevant control signals (where the 'relevant' control signals exclude those that fall outside the min-max threshold range). Erroneous control signals filtered out by the threshold shown in line 8 of the pseudo-code will not be included in the average, and will therefore not impact the actuator control signal provided by the actuator control unit.

It will be appreciated that this pseudo-code could be adapted to include any number of control signals, and that similar pseudo-codes or methodologies can be applied to calculate the median and mode of the obtained respective control signals. It will also be understood that any thresholds described herein may be predetermined thresholds.

Weighting of Control Signals in the Analysis

The analysis may comprise weighting the obtained control signals. The weighting may comprise applying a first coefficient to each of the obtained respective control signals. This first coefficient may be the same for each of the respective control signals, or it may be different for each of the respective control signals. For example, if each of the plurality of FCSs 202 is operating normally, then the first coefficient applied to each respective control signal may be 1.0. Alternatively, if one of the plurality of FCSs 202 appears to be malfunctioning or producing one or more erroneous control signals, then a first coefficient of 0.0 may be applied to the obtained respective control signal for that FCS. Applying a first coefficient of 0.0 may facilitate removal of an obtained respective control signal from the analysis. Thus, the use of a first coefficient of 0.0 is not dissimilar to excluding control signals outside the min-max threshold range exemplified in line 8 of the pseudo-code given above. Both forms of analysis enable outlying or clearly erroneous control signals to be excluded from subsequent analysis. As will be appreciated, removal of a respective control signal from the analysis could occur at any time during the analysis, for example before or after other operations in the analysis. It will be understood that while weightings in the form of coefficients having values of 1.0 and 0.0 have been exemplified above, other values of coefficient and other types of weighting could be used.

Weighting the obtained control signals may also be used in combination with one or more of a mean of the obtained control signals; a median of the obtained control signals; and a mode of the obtained control signals. For example, the analysis may comprise a weighted average of the obtained control signals.

In one weighting example, the method may further comprise, at each of the plurality of actuator control units, and for each of the plurality of FCSs: (a) determining an age of the obtained respective control signal; and (b) weighting the obtained respective control signal based on the determined age.

The age of an obtained control signal may be determined, for example, from a timestamp. The timestamp may be a first timestamp included within the control signal, which represents the time at which the control signal was generated. The first timestamp may be applied by the FCS that generated the control signal on generation of the control signal. Alternatively, the timestamp may be a second timestamp applied to each FCS 202 by each actuator control unit 203. The second timestamp may represent the last time at which the relevant FCS output a control signal for the relevant actuator. Alternatively, second timestamp may represent the last time at which the relevant FCS output any kind of control signal. Thus, the first timestamp is related to the control signal itself, whereas the second timestamp is related to the FCS which produced the control signal. A combination of the first and second timestamps may also be used. As will be appreciated, the age of a respective control signal could also be determined by other means.

Weighting the obtained control signal based on the determined age may comprise applying a second coefficient to the obtained respective control signal. The applied second coefficient may be inversely proportional to the determined age of the obtained respective control signal, such that the older the control signal, the smaller the second coefficient. If the determined age exceeds a threshold, then a coefficient of 0.0 may be applied. As described above, applying a coefficient of 0.0 to a control signal may facilitate removal of the control signal from the analysis. Consequently, control signals over a certain age may be eliminated from the analysis. For example, a threshold of 10 seconds prior to the start of the analysis could be applied, such that a control signal that was produced by the FCS over 10 seconds prior to start of the analysis may have a coefficient of 0.0 applied to it, such that it would be discarded at the start of the analysis. It will be understood that while a threshold of 10 seconds has been exemplified above, the value of the threshold could be a different length of time, or range of times. For example, the value used for the threshold could be on the order of milliseconds, seconds, minutes or hours.

In another weighting example, the method may further comprise, at each of the plurality of actuator control units, and for each of the plurality of FCSs: weighting the obtained respective control signal based on the similarity of the obtained respective control signal to the other obtained control signals.

Under normal operating conditions, i.e. when all of the FCSs 202 are operating correctly and without any malfunctions or faults, at any given actuator control unit, the obtained respective control signals for each of the plurality of FCSs 202, 202b should be substantially the same. This is because the decisions made by the plurality of FCSs on how best to operate the aircraft should be substantially the same under normal operating conditions. As an example, let us consider normal operating conditions of the example architecture 200 shown in FIG. 2A. In this case, the first control signal 2021a obtained from the first FCSs 202a and sent to the first actuator control unit 203a, and the second control signal 2022a obtained from the second FCS 202b and sent to the first actuator control unit 203a should both be substantially the same. Significant or large deviations between the first control signal 2021a obtained from the first FCSs 202a, and the second control signal 2022a from the second FCS 202b may indicate that one or more of the plurality of FCSs 202 is malfunctioning or faulty (i.e. that the architecture 200 is no longer operating under normal conditions). The analysis carried out by each of the plurality of actuator control units 203 may therefore include a comparison of the obtained control signals to identify any similarities and/or differences between the obtained control signals, and by extension any faulty or malfunctioning FCSs. A fault or a malfunction may include, for example, production of an erroneous signal, such as an inaccurate signal (e.g. a signal with a large uncertainty or poor tolerance), or an inability to produce a signal. An erroneous signal may be a signal that compares poorly to signals produced for the same purpose by the other FCSs. A signal may also be considered erroneous if it is obviously contrary to the ongoing safe and/or intended operation of the aircraft. A component of the architecture 200 may be, or become, faulty due to poor calibration, physical damage, noise, or interference, for example. It will be understood that the terms faulty and/or malfunctioning are not binary, and can relate to a spectrum of faults, level of degradation or damage, and/or degree of accuracy.

For example, the analysis carried out by the first actuator control unit 203a may include calculating the difference between the obtained first and second control signals 2021a, 2022a. A substantial difference may indicate that one or more of the FCSs 202 is malfunctioning. In this respect, the first actuator control unit 203a may be able to estimate and/or assign a relative health status of each of the plurality of FCSs 202 based on the obtained control signals. This may be facilitated by identifiers included in the control signals that relate each control signal to the FCS that generated that control signal.

In the case of an architecture comprising more than two FCSs, if the set of obtained control signals has a relatively large standard deviation (or a large coefficient of variation), this may indicate that one or more of the plurality of FCSs is malfunctioning. As an example, consider an architecture comprising three FCSs, where control signals obtained by a particular actuator control unit include two control signals that are substantially the same (e.g. 1.1 and 1.2) and a third control signal which is substantially different to the other two (e.g. 8.6). Such a situation may be indicative that the third control signal is erroneous. Thus, this control signal could be ignored entirely in subsequent analysis, or given a much lower weighting coefficient than the other two control signals.

For each actuator control unit 203, if an obtained control signal comprises control signals for each of the plurality of actuators, the actuator control unit may compare control signals for actuators other than its associated actuator as part of its assessment of the health of each of the plurality of FCSs 202. For example, the first actuator control unit 203a may also obtain and compare the control signals 2021b, 2022b for actuating the second actuator 204b. This allows for the first actuator control unit 203a to assess not only the health of the plurality of FCSs 202 with respect to control signals for actuating the first actuator 204a, but also the health of the plurality of FCSs 202 with respect to control signals for actuating the second actuator 204b (i.e. the overall health of each of the plurality of FCS 202).

Having analysed the similarity of the obtained control signals (e.g. having calculated the differences between, and/or standard deviations/coefficients of variation of, the control signals), the actuator control units 203 may then apply a weighting to the obtained control signals based on the analysis of the similarity of the control signals. This weighting may be a third coefficient applied to each of the obtained control signals, which may be the same for each control signal, or which may be different for each control signal, for example.

Let us now consider the first actuator control unit 203a in the context of the architecture 200 shown in FIG. 2A, and in a reflection of the pseudo-code shown above. The first control signal 2021a may comprise a value of 0.5, and the second control signal 2022a may comprise a value of 0.6. These values may be representative of the control signals for actuating the first actuator 204a. The first and second control signals 2021a, 2022a may be obtained by the first actuator control unit 203a, which then analyses the obtained control signals. As part of the analysis, the first actuator control unit 203a may take a difference of the values comprised by the first and second control signals 2021a, 2022a. For example, the first actuator control unit 203a may calculate the absolute difference between the control signals as: 0.6-0.5=0.1. If this difference of 0.1 is substantial with respect to the precision required for the control signals, then the first actuator control unit 203a may decide that one or more of the FCSs 202 has a malfunction or fault. The first actuator control unit 203a may decide which of the FCSs 202 has a malfunction/fault by checking to see if any of the control signals 2021a, 2022a lie outside an allowed range of values. For example, the first actuator control unit 203a may check the values of each of the control signals 2021a, 2022a to see if they lie outside an allowed range of between 0.45 and 0.55. In this case, since the value of 0.6 comprised by the second control signal 2022a lies outside of this predetermined allowed range of between 0.45 and 0.55, the first actuator control unit 203a may decide that the second FCS 202b has a malfunction/fault. Alternatively/additionally, the first actuator control unit 203a may decide which of the FCSs 202 has a malfunction/fault by checking to see if any of the FCSs is providing erroneous data in respect of actuators associated with other actuator control units. For example, the first actuator control unit 203a may check whether control signals 2021b, 2022b for actuating the second actuator 204b are null and/or outside an allowed range of values. Each of the methodologies described above for deciding which of the FCSs 202 has a malfunction/fault may be carried out before, or preferably after, an actuator control unit 203 has calculated the differences between, and/or standard deviations of, the control signals. It will be understood that it will generally become more apparent which FCSs may be producing outlying control signals (and therefore which FCSs may be malfunctioning or faulty) as the number of FCSs comprised by the architecture increases.

Having decided that one or more of the FCSs 202 has a malfunction or fault, the first actuator control unit 203a may then apply a weighting to one or more of the first control signal 2021a and the second control signal 2022a. For example, the first actuator control unit 203a may apply a third coefficient to one or more of the first control signal 2021a and the second control signal 2022a. The first actuator control unit 203a may then carry out a weighted average of the obtained control signals (taking into account the third coefficients) to calculate the actuator control signal 2031 to provide to the associated actuator 204a. In doing so, the contribution of the obtained control signal from the one or more faulty or malfunctioning FCSs to the actuator control signal 2031 provided to the actuator 204a can be reduced, or eliminated entirely.

While a simple example comparing two obtained control signals is outlined above, it will be understood that this type of analysis could be applied by an actuator control unit to a larger number of obtained control signals. For example, for a plurality of obtained controls signals, the average difference between the obtained control signals and/or the standard deviation of the signals may be used in such an analysis. The use of three or more FCSs 202 would be useful in this regard to help identify outliers in the control signals provided by the FCSs 202. For example, referring to the example analysis above, a third control signal (not shown) from a third FCS (not shown) may comprise a value of 0.5, such that the set of control signals (including the first control signal 2021a, the second control signal 2022a, and the third control signal) comprises the values (0.5, 0.6, 0.5). The mode and the median of this set of values are both 0.5, which makes it apparent that the value of 0.6 from the second control signal 2022a is likely to be erroneous, such that the second FCS 202b is likely to be the malfunctioning or faulty FCS.

In a further weighting example, the method further comprises, at each of the plurality of actuator control units 203, and for each of the plurality of FCSs 202: weighting the obtained respective control signal 2021, 2022 based on whether the obtained respective control signal exceeds a threshold. In a similar manner to the threshold test shown in line 8 of the pseudo-code above, a threshold may be used to apply a weighting to one or more of the obtained control signals as part of the analysis carried out by an actuator control unit. One or more threshold tests may therefore be used to apply, for example, a fourth coefficient to one or more of the obtained control signals.

It will be appreciated that any combination of a first coefficient, a second coefficient, a third, and a fourth coefficient as outlined above could be applied to one or more of the obtained control signals during the analysis. As well as being used to lower the contribution of a control signal during the analysis, a weighting or coefficient could also be used to increase or exaggerate the contribution of an obtained control signal during the analysis (e.g. by multiplying a control signal by a factor greater than 1).

Actuator Control

The method may further comprise controlling the associated actuator 204 with the actuator control signal 2031, 2032. As discussed above, the actuator control signal provided by an actuator control unit to its associated actuator may be used to directly control the associated actuator. For example, the actuator control signal provided by an actuator control unit to its associated actuator may be a Pulse Width Modulation (PWM) signal for driving the associated actuator.

In one example, each actuator 204 is associated with only one respective actuator control unit 203, such that the associated actuator 204 is provided an actuator control signal 2031, 2032 from only one actuator control unit 203. For example, in the context of the example architecture 200 shown in FIG. 2A, the first actuator 204a is only associated with the first actuator control unit 203a. It can only receive one or more first actuator control signals 2031 from actuator control unit 203a, and not one or more second actuator control signals 2032 from actuator control unit 203b. This exclusive association may be achieved, for example, by only providing a connection between the first actuator 204a and the first actuator control unit 203a, and not providing a connection between the first actuator 204a and the second actuator control unit 203b. It will be understood that a connection between an actuator and an actuator control unit may be, for example, a wired connection or a wireless connection.

Associating specific actuators with specific actuator control units will generally be done during manufacture or maintenance while the aircraft is on the ground. This may be done, for example, by configuring the connections between the plurality actuators 204 and the plurality of actuator control units 203.

Communications

The methodology described herein is communications agnostic. Nonetheless, some particular options will be described below.

The method may further comprise transmitting the control signals 2021, 2022 via a first communication network to enable each of the plurality of actuator control units 203 to obtain the control signals 2021, 2022. The example architecture 200 of FIG. 2A comprises a first communications network 206 communicably connecting the FCSs 202 to the actuator control units 203. Every actuator control unit 203 may be communicably connected to every FCS 202 by the first communication network 206. The example architecture 200 of FIG. 2A also comprises a second communication network 205 communicably connecting the sensors 201 to the FCSs 202. Every sensor 201 may be communicably connected to every FCS 202 by the second communication network 205. The first and second communication networks 206, 205 may form part of the same communication network, which may save weight and costs by reducing the amount of wiring and hardware required for the communication network. Alternatively, the first and second communication networks 206, 205 may be different communication networks. In one example, the first and/or second communication networks 206, 205 may comprise a Controller Area Network (CAN bus). In order to provide redundancy (and avoid a single point of failure in terms of communications), it would be possible to provide a dually redundant CAN bus. However, it will be appreciated that redundancy in the communication networks could be achieved in other ways. In terms of redundant communication networks, the key point is that there is at least one alternative communication network which may be used for any given communication in the event that the primary communication network for that communication fails.

While an exemplary architecture is described above as comprising one or two communication networks, it will be appreciated that the architecture may comprise any number of communication networks. For example, the architecture may comprise a third communication network (not shown) communicably connecting the actuators 204 to the actuator control units 203. The third communication network may form part of the first and/or second communication network. Alternatively, the first, second, and third communication networks may be different communication networks.

Every control signal generated by the FCSs 202 may be output onto the first communication network. For example, each of the control signals 2021, 2022 generated by the FCSs may be output via, or broadcast via, the first communication network, such that each of the control signals 2021, 2022 can be obtained by the actuator control units 203 via the first communication network 206.

The first communication network 206 may be configured to allow each of the plurality of actuator control units 203 to selectively obtain control signals generated by the FCSs 202. For example, each of the control signals 2021, 2022 may be placed onto the first communication network 206. The first actuator control unit 203a, having access to the first communication network 206, may then inspect the first communication network 206 for control signals generated by the FCSs 202. The first actuator control unit 203a may then identify the first and second control signals 2021a, 2022a located on the first communication network 206 as being for actuating the associated first actuator 204a. The first actuator control unit 203a may then obtain the first and second control signals 2021a, 2022a. Similarly, the second actuator control unit 203b, also having access to the first communication network 206, may inspect the first communication network 206 for control signals generated by the FCSs 202. The second actuator control unit 203b may then identify the third and fourth control signals 2021b, 2022b located on the first communication network 206 as being for actuating the associated second actuator 204b. The second actuator control unit 203b may then obtain the third and fourth control signals 2021b, 2022b from the first communication network 206.

In an exemplary embodiment in accordance with the methodologies described above, the first communication network 206 (and optionally the second network 205) comprises a bus-type architecture. Data (such as control signals 2021, 2022) from the FCSs 202 (and optionally sensor data 2011, 2022 from the sensors 201) is shared via the bus, such that every actuator control unit 203 has access to all the data on the bus by default. The data is shared asynchronously on the communication network, which can contain many different data frequency rates. For example, the control signals 2021, 2022 generated by the FCSs 202 may be added to the bus and obtained by one or more actuator control units 203 as and when they are generated. In other words, data from any of the plurality of FCSs 202 (and optionally data from any of the one or more sensors 201) may be asynchronously published or provided on the communications network. Similarly data from any of the plurality of FCSs 202 (and optionally data from any of the one or more sensors 201) may be asynchronously received or obtained (for example by at least one of the plurality of actuator control units 203) on the communications network. Control signals and data generated by the FCSs 202 may also be stored in a memory (not shown) coupled to the first communication network 206, allowing for logging of the FCS behaviour. Control signals stored in the memory of the first communication network 206 may also be accessed by the actuator control units 203 if required.

Each of the control signals may comprise one or more identifiers, which may be a unique identifier, to facilitate management of the control signals in the first communication network 206. The identifiers of the control signals may also be used by the plurality of actuator control units 203 when obtaining control signals. While described above in the context of the first communication network, identifiers may also be applied to control signals generated by the FCSs 202 more generally, to facilitate management and obtaining of the generated control signals. The identifiers may be applied, for example, by one or more of the FCSs 202 and/or by one or more of the actuator control units 203. Management of the first and/or second communication networks may be carried out by the plurality of FCSs, or by a separate management system (not shown). Such a management system would preferably have an inbuilt redundancy.

It will be understood that while the first communication network 206 is described above as comprising the control signals generated by the FCSs 202, the first communication network 206 may also comprise other signals related to the aircraft and the control of the aircraft.

Sensors and Sensor Data

The present methodology may be applied to an aircraft that further comprises at least one sensor 201, and the method may further comprise the at least one sensor 201 providing sensor data to each of the plurality of FCSs.

The example architecture 200 shown in FIG. 2A comprises a plurality of sensors 201. A first sensor 201a provides first sensor data 2011a to the first FCS 202a, and provides second sensor data 2011b to the second FCS 202b. The first sensor data 2011a and the second sensor data 2011b will generally comprise the same sensor data, such that the first FCS 202a and the second FCS 202b are provided with the same sensor data from the first sensor 201a. However, it will be understood that the first sensor data 2011a and the second sensor data 2011b may be different to each other. Similarly, a second sensor 201b provides third sensor data 2012a to the first FCS 202a, and provides fourth sensor data 2012b to the second FCS 202b. The third sensor data 2012a and the fourth sensor data 2012b will generally comprise the same sensor data, such that the first FCS 202a and the second FCS 202b are provided with the same sensor data from the second sensor 201b. However, it will be understood that the third sensor data 2012a and the fourth sensor data 2012b may be different to each other.

The method may further comprise, at each of the plurality of FCSs 202: generating, based on the sensor data 2011, 2012, the control signals 2021, 2022 for controlling the plurality of actuators 204.

The sensor data provided by the sensors 201 to each FCS 202 may be used by each FCS when generating its respective control signals. As discussed above, the sensor data may comprise measurements of the parameters of the aircraft and/or the aircraft trajectory, for example, such that the control signals generated by the FCSs are based on the flight conditions.

In the context of the example architecture 200 shown in FIG. 2A, the first FCS 202a may receive first sensor data 2011a from the first sensor 201a, and third sensor data 2012a from the second sensor 201b. The received sensor data 2011a, 2012a may provide the first FCS 202a with one or more pieces of information about the current state of the aircraft and its trajectory (for example, the altitude, pitch, and/or heading of the aircraft). The first FCS 202a may then make a decision about how best to control the aircraft based on the information about the current state of the aircraft and its trajectory extracted from the received sensor data 2011a, 2012a. This decision may involve calculating the required states and/or actuations required for each of the plurality of actuators 204 in order to maintain steady flight. It will be understood that maintaining a steady flight may include keeping the aircraft in a stable and safe flight, and/or keeping the aircraft on a predetermined trajectory, for example.

Having made a decision about how best to control the aircraft based on the sensor data 2011a, 2012a received from the first sensor 201a and the second sensor 201b, the first FCS 202a may then generate control signals suitable for controlling the plurality of actuators 204. For example, having made a decision about how best to control the aircraft based on the sensor data 2011a, 2012a received from the first sensor 201a and the second sensor 201b, the first FCS 202a may then generate the first control signal 2021a for controlling the first actuator 204a, and the third control signal 2021b for controlling the second actuator 204b.

The second FCS 202b may carry out an analogous set of steps on sensor data 2011b, 2012b received from the first and second sensors 201a, 201b. However, the decision made by the second FCS 202b about how best to control the aircraft based may not be the same as the decision made by the first FCS 202a, even if the sensor data received from the first and second sensors 201a, 201b is the same for both the first and second FCSs 202a, 202b. In other words, even if the first and second sensor data 2011a, 2011b are the same, and the third and fourth sensor data 2012a, 2012b are the same, the actuation decision made by the first FCS 202a and the second FCS 202b may still not be the same. This may be because one, or both, of the first FCS 202a and the second FCS 202b may have a malfunction or fault, for example.

As discussed above, at least one of the sensors 201 may be a high data rate sensor. For example, the first sensor 201a may be a high data rate sensor, and the second sensor 201b may be a regular data rate sensor. In other words, the first sensor 201a may produce a greater volume of data compared to that produced by the second sensor 201b over a given period of time.

In a preferred embodiment, each FCS 202 has an associated high data rate sensor (e.g. an IMU) from which it receives high data rate sensor data. In this embodiment, each FCS 202 also receives lower data rate sensor data from the high data rate sensors (IMUs) associated with the other FCSs 202. In this embodiment, consider the first sensor 201a and the second sensor 201b of FIG. 2B to be high data rate sensors. In other words, both the first and second sensors 201a, 201b may produce large volumes of data over a given period of time as compared to other types of sensor. Notably, the plurality of sensors may comprise additional sensors not shown in FIG. 2B, and these may be any combination of high data rate sensors and/or "normal" sensors (that is to say not high data rate sensors).

With respect to the embodiment where both the first and second sensors 201a, 201b are high data rate sensors, the first sensor 201a may provide first sensor data 2011a to the first FCS 202a at a first data rate and second sensor data 2011b to the second FCS 202b at a second data rate, wherein the first data rate is greater than the second data rate. Similarly, the second sensor 201b may provide third sensor data 2012a to the first FCS 202a at a third data rate and fourth sensor data 2012b to the second FCS 202b at a fourth data rate, wherein the fourth data rate is greater than the third data rate. Here, with respect to the first sensor 201a, the first FCS 202a may be considered as forming a first set of FCSs, and the second FCS 202b may be considered as forming a second set of FCSs. Similarly, with respect to the second sensor 201b, the second FCS 202b may be considered as forming a first set of FCSs, and the first FCS 202a may be considered as forming a second set of FCSs. However, it will be appreciated that many different sets of FCSs 202 could be formed depending on the number of FCSs 202 in the architecture.

Continuing with the embodiment where both the first and second sensors 201a, 201b are high data rate sensors, the first FCS 202a can use the received first and third sensor data 2011a, 2012a in much the same way as the received first and third sensor data 2011a, 2012a in the other examples described above. Specifically, as described above, the first FCS 202a can make a decision about how best to control the aircraft based on the information about the current state of the aircraft and its trajectory extracted from the received sensor data 2011a, 2012a. However, because the data rate of the received first sensor data 2011a is higher than the data rate of the received third sensor data 2012a, the first FCS 202a may handle the decision making in a slightly different way. In a specific example, if the first sensor 201a was of the same type of sensor as the second sensor 201b (e.g. the first and second sensors 201a, 201b were both IMUs comprising accelerometers and gyroscopes), the first FCSs 202a may use the received first sensor data 2011a having the higher data rate as the primary source of information for at least one part of its decision making, and may use the received third sensor data 2012b having the lower data rate merely as a cross-check for the received first sensor data 2011a. In other words, in its decision making process, the first FCS 202a may prioritise use of the received first sensor data 2011a (which generally comprises a larger volume of data, and therefore a larger amount of information) over the received third sensor data 2012a (which generally comprises a comparatively smaller volume of data, and therefore a comparatively smaller amount of information). However, should one of the high data rate sensors 201a, 201b fail (for example, should the first sensor 201a fail), the received third sensor data 2012a having the lower data rate can nonetheless be used in the decision making process to compensate (or provide a replacement) for a loss of the high data rate data from the first sensor 201a.

The second FCS 202b may carry out an analogous decision making process on sensor data 2011b, 2012b received from the first and second sensors 201a, 201b.

In a first example, the method may comprise transmitting the sensor data via the second communication network 205 to enable each of the plurality of FCSs 202 to obtain the sensor data. As described above, the second communication network 205 may be separate from the first communication network 206. In one example, all of the sensor data 2011, 2012 may be placed onto the second communication network 205. The first FCS 202a, having access to the second communication network 205, may then inspect the second communication network 205 for sensor data generated by the sensors 201. The first FCS 202a may then identify the first and third sensor data 2011a, 2012a (i.e. sensor data from each of the plurality of sensors 201) located on the second communication network 205 as being relevant for generating control signals for the aircraft. The first FCS 202a may then obtain the first and third sensor data 2011a, 2012a from the second communication network 205. Similarly, the second FCS 202b, also having access to the second communication network 205, may inspect the second communication network 205 for sensor data generated by the sensors 201. The second FCS 202b may then identify the second and fourth sensor data 2011b, 2012b located on the second communication network 205 as being relevant for generating control signals for the aircraft. The second FCS 202b may then obtain the second and fourth sensor data 2011b, 2012b from the second communication network 205.

In a second example, the method may further comprise transmitting the sensor data via the first communication network 206 to enable each of the plurality of FCSs 202 to obtain the sensor data. As described above, the first and second communication networks may form part of the same communication network (e.g. the first communication network 206). Thus, as well as carrying control signals from the FCSs 202 to the actuator control units 203, the first communication network 206 may also carry sensor data from the plurality of sensors 201, such that the FCSs 202 are able to obtain this sensor data via the first communication network 206. For example, all of the sensor data 2011, 2012 may be placed onto the first communication network 206. The first FCS 202a, having access to the first communication network 206, may then inspect the first communication network 206 for sensor data generated by the sensors 201. The first FCS 202a may then identify the first and third sensor data 2011a, 2012a (i.e. sensor data from each of the sensors 201) as being relevant for generating control signals for the aircraft. The first FCS 202a may then obtain the first and third sensor data 2011a, 2012a. Similarly, the second FCS 202b, also having access to the first communication network 206, may inspect the first communication network 206 for sensor data generated by the sensors 201. The second FCS 202b may then identify the second and fourth sensor data 2011b, 2012b located on the first communication network 206 as being relevant for generating control signals for the aircraft. The second FCS 202b may then obtain the second and fourth sensor data 2011b, 2012b from the first communication network 206.

It should be noted that while sensor data from at least one high data rate sensor (where provided) may be transmitted through the first or second communication networks 206, 205 as described above, sensor data from at least one high data rate sensor may also (or alternatively) be transmitted via at least one separate high data rate sensor network (not shown). The at least one high data rate sensor network (not shown) may be configured to allow each high data rate sensor to be positioned in close proximity to the FCS to which it sends data at the first (higher) data rate. To illustrate this, in an example where the first sensor 201a is a high data rate sensor, the first sensor 201a may be positioned in close proximity to the first FCS 202a and connected thereto via a first high data rate sensor network (now shown). In use, the first sensor 201a may then provide first sensor data 2011a at a first data rate to the first FCS 202a via the first high data rate sensor network (not shown), and second sensor data 2011b at a second date rate to the second FCS 202b via the first communication network 206. Alternatively, the first sensor 201a may provide the second sensor data 2011b at a second date rate to the second FCS 202b via the second communication network 205 or via a second high data rate sensor network (not shown). Notably, the at least one high data rate sensor network (not shown) may use I2O or SPI bus technology. Moreover, positioning the at least one high data rate sensor in close proximity to the FCS to which it sends data at a first data rate allows the at least one high data rate sensor network (not shown) to be physically short in length.

While optimisation of sensor positions is not the subject of this application, the skilled person would be aware of various techniques for optimising sensor positions and sensor orientations that could be applied to, or alongside, the architecture described herein. For example, the paper "*A new approach to better low-cost MEMS IMU performance using sensor arrays*" by Martin et al, from The Institute of Navigation (ION) GNSS+(16-20 Sep. 2013), discusses several techniques for improving the performance of low-cost MEMS IMUs. The techniques include: arranging the sensitive axes of sensors in opposite directions to reduce the effect of systematic errors correlated across sensors of the same design; exploiting performance differences between in-plane and out-of-plane sensors on a sensor triad; and combining outputs of sensors with different operating ranges to increase measurement accuracy during periods of relatively low dynamics without clipping and distorting under high dynamics. A combination of the architecture described herein and sensor position optimisation may further reduce the overall cost of the aircraft.

Flight Control System Synchronisation

Advantageously, the present methodology may be applied to an aircraft that further comprises at least one communications manager 207, and the method may further comprise one or more of: receiving, by the communications manager 207, state data 2072 from at least one FCS 202 for determining a state of the aircraft and/or a state of the at least one FCS 202; and transmitting, by the communications manager 207, synchronisation information 2071 to at least one of the plurality of FCSs 202 for synchronising operation of the plurality of FCSs 202.

The example architecture 200 shown in FIG. 2B additionally comprises a communications manager 207 to facilitate communications between a GCS 208 and the plurality of FCSs 202. The communications manager 207 may transmit synchronisation information 2071 to one or more of the plurality of FCSs 202. The transmission of synchronisation information 2071 to one or more of the plurality of FCSs 202 may be carried out any number of times. For example, synchronisation information 2071 may be transmitted only once, or it may be transmitted periodically or intermittently. Preferably, the synchronisation information 2071 transmitted to each of the plurality of FCSs 202 is the same. In other words, first synchronisation information 2071a transmitted to the first FCS 202a is preferably the same as second synchronisation information 2071b transmitted to the second FCS 202b. However, it will be apparent that different synchronisation information 2071 could be sent to each of the plurality of FCSs 202 or to different sets of the plurality of FCSs. Alternatively, the same synchronisation information 2071 may be sent to each of the plurality of FCSs 202, but at different times for each of the plurality of FCSs 202 or different sets of the plurality of FCSs 202.

The synchronisation information 2072 may be sent to each of the plurality of FCSs 202 via the first communication network, the second communication network, or by a separate communications manager network (not shown).

The synchronisation information 2071 may be received from the GCS 208 or may be based on instructions received from the GCS 208, for example via a communications link 2081. In some examples, the communications link 2081 between the GCS 208 and the aircraft may be handled or controlled by at least one communications module (not shown) of the aircraft. The instructions received from the GCS 208 may change over time, for example as a mission of the aircraft develops over time or as the aircraft passes through a series of waypoints. Thus, the synchronisation information 2071 may also change over time.

Advantageously, the communications manager 207 may also receive state data 2072 from one or more of the plurality of FCSs 202. In the example shown in FIG. 2B, the communications manager 207 may receive first state data 2072a from the first FCS 202a and second state data 2072b from the second FCS 202b. However, the state data 2072 is not shared between the plurality of FCS 202. The state data 2072 may be used, for example, to determine an overall "true state" (e.g. a current overall condition, mode of operation, flight status, or health status) of the aircraft. In doing so, a state of the individual FCSs 202 may also be determined. Additionally, or alternatively, the state data 2072 may be used to create at least one alert and/or warning message for a pilot/operator of the aircraft. The alert and/or warning message may be in the form of a text-based message, a symbol-based message, an audible message, or a combination of these. Specifically, the communications manager 207 may process the received state data 2072 to determine a state of each of the plurality of FCS 202, and thereby determine an overall state of the aircraft. In one example, the communications manager 207 processes the received first state data 2072a to determine a state of the first FCS 202a, and processes the received second state data 2072b to determine a state of the second FCS 202b. The determined states of the first and second FCSs 202a, 202b may then be compared (e.g. to each other or to one or more reference values) to determine the overall state of the plurality of FCSs 202a, 202b and/or the aircraft.

The communications manager 207 may also process the received state data 2072 to create the at least one alert/warning message. Such an alert or warning message may be created if, for example, one or more of the plurality FCSs 202 disconnects from the network or goes offline (e.g. fails to publish data onto the network), or if the status of one of the plurality of FCSs 202 deviates significantly from the status of the other of the plurality of FCSs 202. The generated alert/warning message may be sent to the GCS 208, for example via the communications link 2081, to allow it to be received or viewed by an operator of the aircraft. If required, the aircraft operator may then act upon the received alert/warning message. Additionally, or alternatively, at least part of the received state data 2072 may be sent to the GCS 208, for example via the communications link 2081. A separate analysis of the received state data can then be carried out at the GCS 208, if required.

Optionally, the communications manager 207 may also receive state data (not shown) from all sensors and/or actuator control units in order to assess an overall health of the architecture 200. In order to transmit synchronisation information 2071 and/or receive state data, the communications manager 207 may be connected to one or more of the communications networks described above, and/or by a separate communications manager network (not shown).

Independence of Actuator Control Units

Advantageously, the analysis of the obtained control signals carried out at each of the actuator control units may be independent of analysis carried out at the other actuator control units. Thus, in the context of the example architecture 200 shown in FIG. 2A, the analysis carried out by the first actuator control unit 203a is independent of the analysis carried out by the second actuator control unit 203b. In other words, the first actuator control unit 203a arrives at its decision about the first actuator control signal 2031 to provide to its associated actuator 204a, without any influence or communication with the second actuator control unit 204b. The second actuator control unit 203b cannot influence the analysis of the first actuator control unit 203a, and likewise the first actuator control unit 203a cannot influence the analysis of the second actuator control unit 203b. Said another way, at every level of the example architecture 200 shown in FIG. 2A, there is no cross-communication between components of the same type (i.e. there is no intra-level communication)—components of the same type operate independently of each other. Thus, none of the sensors 201 communicate or share information with one another; none of the FCSs 202 communicate or share information with one another; none of the actuator control units 203 communicate or share information with one another; and none of the actuators 204 communicate or share information with one another. This helps reduce the likelihood of faults propagating laterally through the architecture 200.

In contrast, all communication is inter-level communication (i.e. between different levels of the architecture). Each component in one level of the architecture only broadcasts or outputs signals down to the level below it. That is not to say that the components cannot also receive or obtain signals from the level above, only that they cannot broadcast or output signals to components within the same level of the architecture.

An Exemplary Implementation of an Actuator Control Unit

Figure 3:
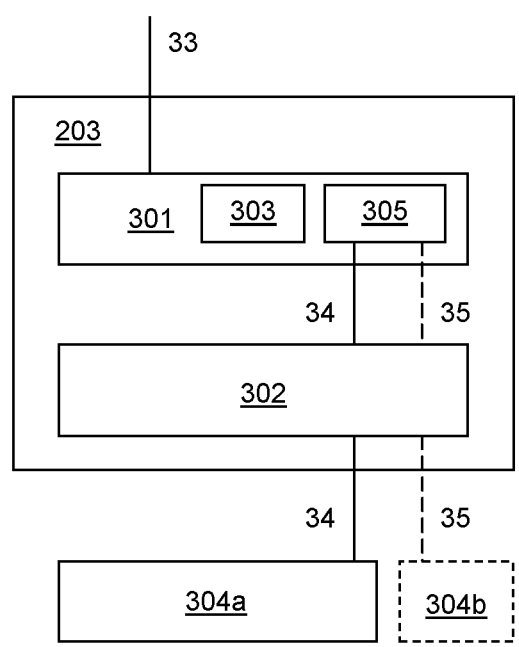
FIG. 3 is a schematic diagram detailing constructional features of an actuator control unit connected to an associated actuator.

FIG. 3 shows an example configuration of an actuator control unit 203, which may be one of the plurality of actuator control units 203 shown in the architecture 200 of FIG. 2A. A first connection 33 may be provided to communicatively connect the actuator control unit 203 to the plurality of FCSs 202. A second connection 34 may be provided to communicatively connect the actuator control unit 203 to a first actuator 304a associated with the actuator control unit 203. The first actuator 304a may be one of the plurality of actuators 204 shown in FIG. 2A. An optional third connection 35 may be provided to communicatively connect the actuator control unit 203 to one or more additional actuators 304b. The one or more additional actuators 304b may also be included in the plurality of actuators 204 shown in FIG. 2A.

The example actuator control unit 203 comprises a first portion 301 and a second portion 302. The first portion 301 interfaces with the plurality of FCSs 202 and performs core processing. Thus, the first portion 301 may be a platform agnostic component. The second portion 302 acts as an interface between the first portion 301 and the actuators 304. Thus, the second portion 302 may be a platform specific component. Both the first and second portions 301, 302 will be discussed in further detail below.

As mentioned above, the first portion 301 of the actuator control unit 203 provides an interface between the FCSs 202 and the second portion 302 of the actuator control unit 203. Thus, the first portion is configured to obtain the control signals from the FCSs 202 via the first connection 33. The first portion 301 comprises at least one processor 303 for carrying out one or more steps of the methodology set out above, such as carrying out the analysis of the obtained control signals.

Having performed the analysis to generate an actuator control signal, the first portion 301 is then configured to output the actuator control signal to the relevant actuator 304. Thus, the first portion 301 may comprise a means to selectively connect to the first actuator 304a and/or the one or more additional actuators 304b. For example, the first portion 301 of the actuator control unit 203 may comprise a switch 305 for selectively activating and deactivating the second and/or third connections 34, 35. In one example, the second and third connections 34, 35 are channels that can be selectively assigned to the actuator control unit 203 by the switch 305. In one non-limiting example, the switch 305 may be a Dual Inline Package (DIP) switch comprising a plurality of sliders (not shown) for configuration of the channel assignments. For example, the DIP switch may comprise two 2-position sliders, such that the DIP switch may allow for four configurations of the connections 34, 35, shown in Table 1 below.

TABLE 1

| Slider 1 Position | Slider 2 Position | Outcome |
| --- | --- | --- |
| 0 | 0 | No Connections Activated |
| 0 | 1 | Second Connection 34 Activated; Third Connection 35 Not Activated |
| 1 | 0 | Second Connection 34 Not Activated; Third Connection 35 Activated |
| 1 | 1 | Second Connection 34 Activated; Third Connection 35 Activated |

While the DIP switch is described above as having two sliders, it will be appreciated that the DIP switch may comprise more than two sliders for the configuration of more than two connections or channels. It will also be appreciated that the first connection 33, the second connection 34, and the third connection 35 could each comprise multiple channels or multiple connections. The first connection 33, the second connection 34, and the third connection 35 may each comprise wired and/or wireless connections. While the assignment of channels is described above using a DIP switch, it will be appreciated that channel assignment may be carried out by another means.

As mentioned above, the second portion 302 acts as an interface between the first portion 301 and the actuators 304. Actuator control signals generated by the first portion 301 are provided to the actuators 304 via the second portion 302, i.e. the connections 34, 35 connect the first portion 301 to the second portion 302, and the second portion 302 to the actuators 304. Thus, the second portion 302 is configured to allow actuator control signals generated by the actuator control unit 203 to be provided to the actuators 304. The second portion 302 may also be configured to handle power requirements specific to each of the actuators 304. For example, the second portion 302 may be configured to allow connection of the first portion 301 to a servo actuator. In another example, the second portion 302 may be configured to allow connection of the first portion 301 to a hydraulic ram actuator. The signal and power requirements for a servo actuator and a hydraulic ram actuator may be very different, so the configuration of the second portion 302 may be adapted depending on the actuators 304 associated with the actuator control unit 302. In other words, as mentioned above, the second portion 302 may be platform specific. The second portion 302 may also collect various metrics from the actuators 304 in order to monitor the health of the actuators 304.

The first portion 301 may comprise a first printed circuit board (PCB), and the second portion 302 may comprise a second PCB. The first and second portions 301, 302 may be operably and removably connected to each other in use. In one non-limiting example, the second portion 302 is installed adjacent a corresponding actuator 304 mounted in an aircraft, the second portion 302 being configured for use with the corresponding actuator 304 (which may be, for example, a servo actuator). The first portion 301 may then be removably connected to the second portion 302, for example by plugging the first PCB into the second PCB. Thus, the design of the second portion 302 may be specific to the corresponding servo actuator 304 (i.e. the second portion 302 may have a platform specific design), whereas the design of the first portion 301 may be such that it can be installed at any of a number of second portions installed adjacent a corresponding actuator 304, such as a second portion 302 installed by a hydraulic ram actuator or a second portion 302 installed by a servo actuator (i.e. the design of the first portion is platform agnostic). In other words, the first PCB could be plugged into any one of a variety of second PCBs distributed throughout the aircraft. The platform agnostic first portion 301 means that at least part of the actuator control unit 203 can be manufactured in bulk for installation in many different aircraft designs. It also means that fitting out a particular aircraft is less costly and less complex, as a large number of identical first portions 301 can be used. This reduces the costs of the flight control architecture installed in an aircraft, which is particularly important for the development and operation of low-cost UAVs.

It will be appreciated that while the portions 301, 302 are described above as being located close to each other (e.g. by plugging the first PCB into the second PCB), the portions 301, 302 may also be located remote from each other. Furthermore, there is no necessity for the actuator control unit 203 to be collocated with a given mechanical actuator. However, this is less desirable as it would either require a larger amount of wiring, or it would require wireless connections which may be less stable.

The actuator control unit 203 may comprise one or more input/output connectors (not shown) for connection to the first communication network. The one or more input/output connectors may be included on the first portion 301, for example on the first PCB. A plurality of actuator control units 203 may be daisy-chained together on the communication network via the one or more input/output connectors to allow throughput of data in the communication network. However, it will be understood that the throughput of data via the daisy-chain does not allow for sharing of data between the actuator control units 203.

The invention claimed is:

1. A method of controlling an aircraft, the aircraft comprising a plurality of actuators, a plurality of actuator control units, and a plurality of flight control systems for generating control signals, the method comprising, at each of the plurality of actuator control units:
from each of the plurality of flight control systems, obtaining a respective control signal for controlling an actuator associated with the actuator control unit, the actuator being one of the plurality of actuators; and
providing an actuator control signal to the associated actuator, wherein the actuator control signal is based on an analysis of the obtained control signals,
wherein:
at each of the actuator control units, the analysis of the obtained control signals is independent of analyses carried out at the other actuator control units; and
each of the plurality of flight control systems operates independently of the other flight control systems and independently of the plurality of actuator control units.

2. The method of claim 1, wherein the analysis comprises one or more of:
a mean of the obtained control signals;
a median of the obtained control signals;
a mode of the obtained control signals;
a time series analysis of the obtained control signals;
a regression of the obtained control signals;
an extrapolation of the obtained control signals;
an artificial neural network analysis of the obtained control signals; and
weighting the obtained control signals.

3. The method of claim 2, further comprising, at each of the plurality of actuator control units, and for each of the plurality of flight control systems:
determining an age of the obtained respective control signal; and
weighting the obtained respective control signal based on the determined age.

4. The method of claim 2, further comprising, at each of the plurality of actuator control units, and for each of the plurality of flight control systems:
weighting the obtained respective control signal based on the similarity of the obtained respective control signal to the other obtained control signals.

5. The method of claim 2, further comprising, at each of the plurality of actuator control units, and for each of the plurality of flight control systems:
weighting the obtained respective control signal based on whether the obtained respective control signal exceeds a threshold.

6. The method of claim 1, further comprising controlling the associated actuator with the actuator control signal.

7. The method of claim 1, wherein the associated actuator is associated with only one actuator control unit, such that the associated actuator is provided an actuator control signal from only one actuator control unit.

8. The method of claim 1, further comprising:
transmitting the control signals via a first communication network to enable each of the plurality of actuator control units to obtain the control signals.

9. The method of claim 1, wherein the aircraft further comprises at least one sensor, and the method further comprises:
the at least one sensor providing sensor data to each of the plurality of flight control systems; and
at each of the plurality of flight control systems generating, based on the sensor data, the control signals for controlling the plurality of actuators.

10. The method of claim 9, wherein the at least one sensor comprises at least one high data rate sensor providing sensor data at a first data rate to at least one of the plurality of flight control systems and providing sensor data at a second data rate to other ones of the plurality of flight control systems, the first data rate being higher than the second data rate.

11. The method of claim 10, wherein the at least one high data rate sensor comprises at least one inertial measurement unit.

12. The method of claim 9, further comprising:
transmitting the sensor data via the first communication network to enable each of the plurality of flight control systems to obtain the sensor data.

13. The method of claim 9, further comprising:
transmitting the sensor data via a second communication network to enable each of the plurality of flight control systems to obtain the sensor data.

14. The method of claim 1, wherein the aircraft further comprises a communications manager, and the method further comprises one or more of:
receiving, by the communications manager, state data from at least one flight control system for determining a state of the aircraft and/or a state of the at least one flight control system; and
transmitting, by the communications manager, synchronisation information to at least one of the plurality of flight control systems for synchronising operation of the plurality of flight control systems,
wherein:
the state data comprises one or more of:
an attitude of the aircraft;
a position of the aircraft;
an airspeed of the aircraft;
an altitude of the aircraft;
a network status of the flight control system;
a health status of the flight control system; and
a power status of the flight control system; and
the synchronisation information comprises one or more of:
a flight mode;
at least one waypoint;
at least one rally point;
at least part of a mission; and
at least one flight control parameter.

15. The method of claim 14, further comprising:
processing, by the communications manager, the state data to determine the state of the aircraft and/or the state of the at least one flight control system;
optionally wherein the processing comprises generating an alert or warning message based on the state data.

16. The method of claim 14, wherein the method further comprises one or more of:
receiving, by the communications manager, the synchronisation information from a ground control station; and
transmitting, by the communications manager, the state data to a ground control station.

17. An aircraft system comprising:
a plurality of actuators;
a plurality of actuator control units; and
a plurality of flight control systems for generating control signals, each of the plurality of flight control systems being configured to operate independently of the other flight control systems and independently of the plurality of actuator control units, wherein:
: each actuator control unit is configured to:
: : obtain a respective control signal for controlling one of the actuators that is associated with the actuator control unit; and
: : provide an actuator control signal to the associated actuator, wherein the actuator control signal is based on an analysis of the obtained control signals; and
: at each of the actuator control units, the analysis of the obtained control signals is independent of analyses carried out at the other actuator control units.

18. The aircraft system of claim 17, further comprising one or more of:
: at least one sensor;
: at least one high data rate sensor;
: a first communication network;
: a second communication network; and
: a communications manager.

19. The aircraft system of claim 17, wherein each of the plurality of flight control systems operates without influence or communication from the plurality of actuator control units.

20. The method of claim 1, wherein each of the plurality of flight control systems operates without influence or communication from the plurality of actuator control units.

* * * * *